United States Patent [19]

Harold et al.

[11] 4,242,115

[45] Dec. 30, 1980

[54] AIR CLEANER ASSEMBLY

[75] Inventors: Donald M. Harold, Prior Lake; Gregory A. Ufken, Apple Valley, both of Minn.

[73] Assignee: Donaldson Company, Inc., Minneapolis, Minn.

[21] Appl. No.: 9,404

[22] Filed: Feb. 5, 1979

[51] Int. Cl.³ ............................................. B01D 45/12
[52] U.S. Cl. ....................................... 55/347; 55/414; 55/431
[58] Field of Search ................. 55/344, 347, 348, 341, 55/396, 48, 414, 274, 385 B, 423, 430, 431, 457, 466

[56] References Cited

U.S. PATENT DOCUMENTS

| | | | |
|---|---|---|---|
| 2,515,894 | 7/1950 | Polk | 55/344 |
| 3,165,390 | 1/1965 | Parken et al. | 55/431 |
| 3,237,386 | 3/1966 | Farr et al. | 55/466 |
| 3,483,676 | 12/1969 | Sargisson | 55/306 |
| 3,520,114 | 7/1970 | Pall et al. | 55/347 |
| 3,713,280 | 1/1973 | Keller et al. | 55/457 |
| 3,915,679 | 10/1975 | Roach et al. | 55/347 |

OTHER PUBLICATIONS

STB Strata Engine Air Systems, Donaldson Company, Inc., Bulletin 1200-1240, Copyright 1974.
Strata Panel Inertial Separators, Donaldson Company, Inc., Bulletin 3000-3020, Copyright 1974.

*Primary Examiner*—David L. Lacey

[57] ABSTRACT

An air cleaner assembly (10) is disclosed. The assembly (10) includes a plurality of interconnected wall members (14, 16, 18, 20) which define between them a generally ring-shaped scavenging air chamber (22). A plurality of centrifugal separators (24) are supported in the scavenging air chamber (22). Each centrifugal separator (24) includes a first tubular member (26) which has an inlet end (32) for admitting air and an outlet end (34) which is in fluid communication with the scavenging air chamber (22). Each centrifugal separator (24) also includes a mechanism (30) for swirling air passing through the first tubular member (26) and a second tubular member (28). The second tubular member (28) has an inlet end (36) adjacent the outlet end (34) of the first tubular member (26) and an outlet end (38) exterior of the scavenging air chamber (22). A scavenging air outlet port (54) is formed through the cylindrical wall (14) and is adapted to be coupled to a negative pressure source for drawing scavenging air and solid materials intermixed therewith from the scavening air chamber (22). A pair of discrete conduits (74, 76) are supported within the scavenging air chamber between a pair of adjacent rows (23c, 23d) of centrifugal separators (24). The conduits (74, 76) have first ends (78, 82) respectively, and second ends (80, 84) respectively. The first ends (78, 82) are disposed adjacent the scavenging air outlet port (54) while the second ends (80, 84) are disposed a distance therefrom to stage the negative pressure applied through the scavenging air outlet port (54).

26 Claims, 10 Drawing Figures

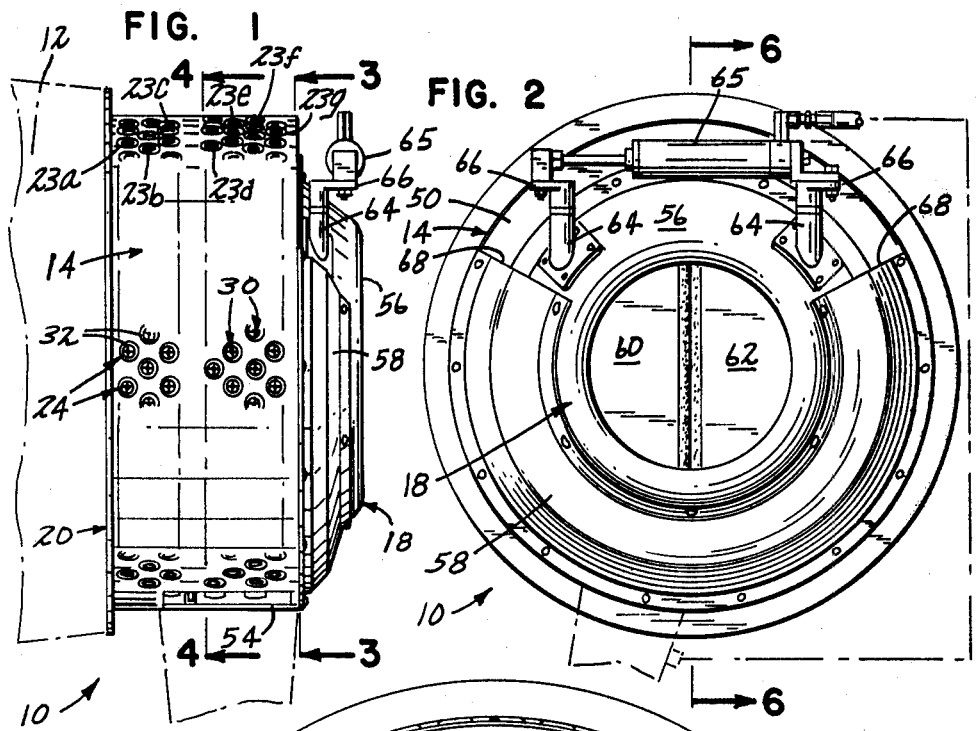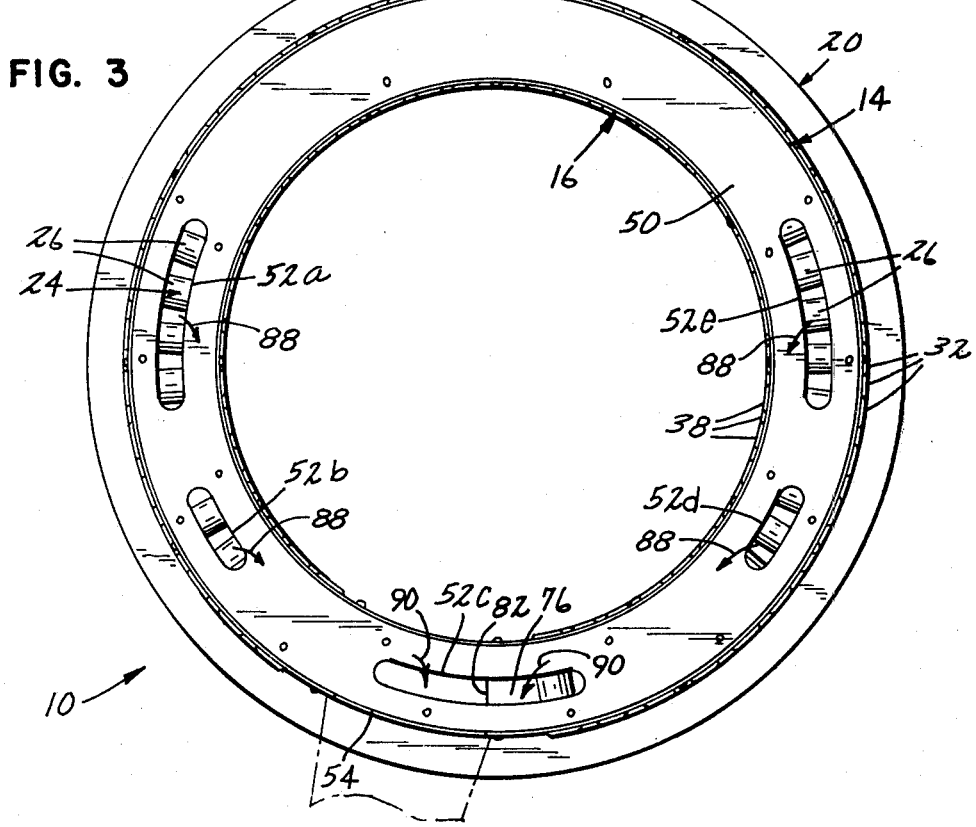

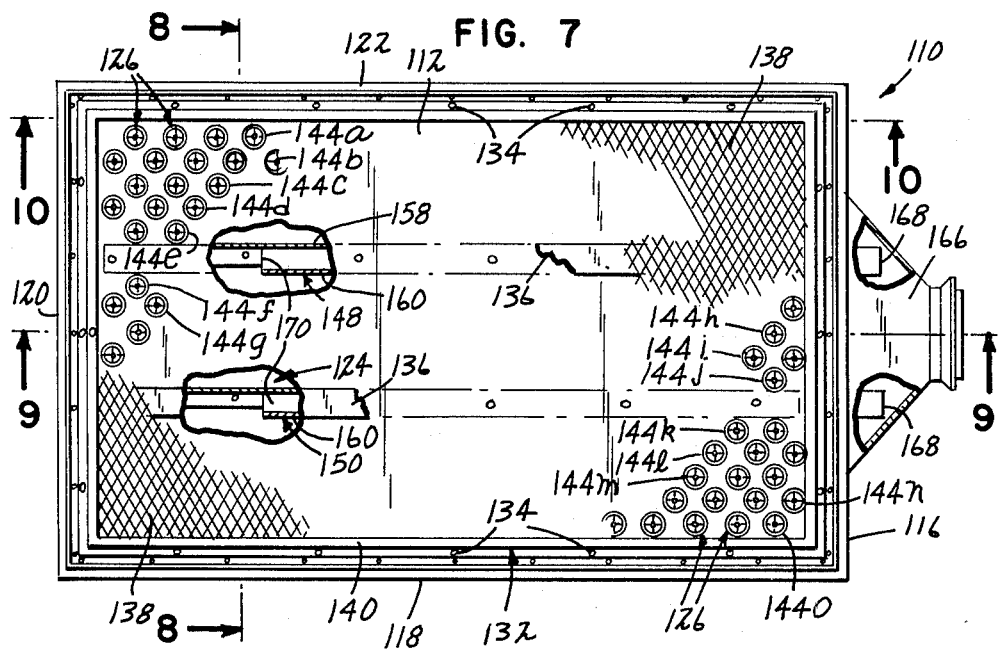
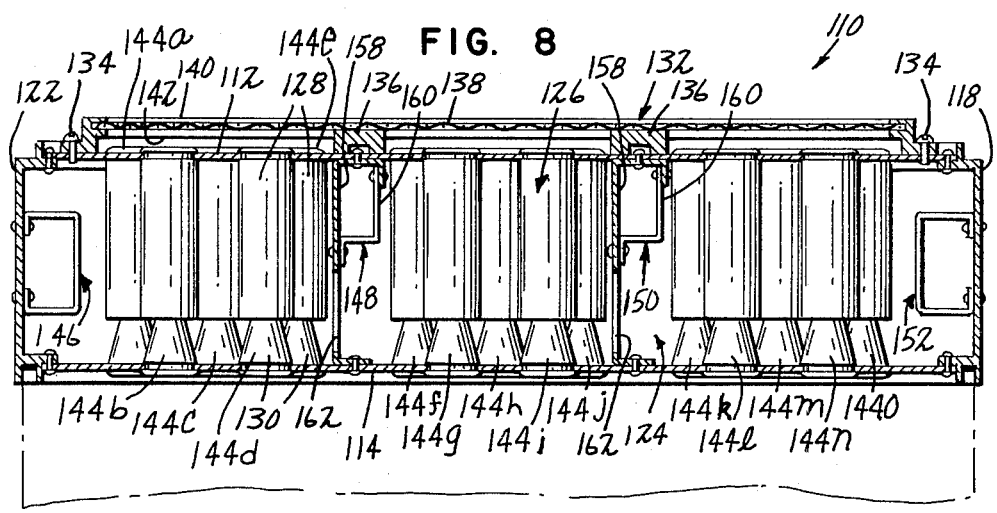

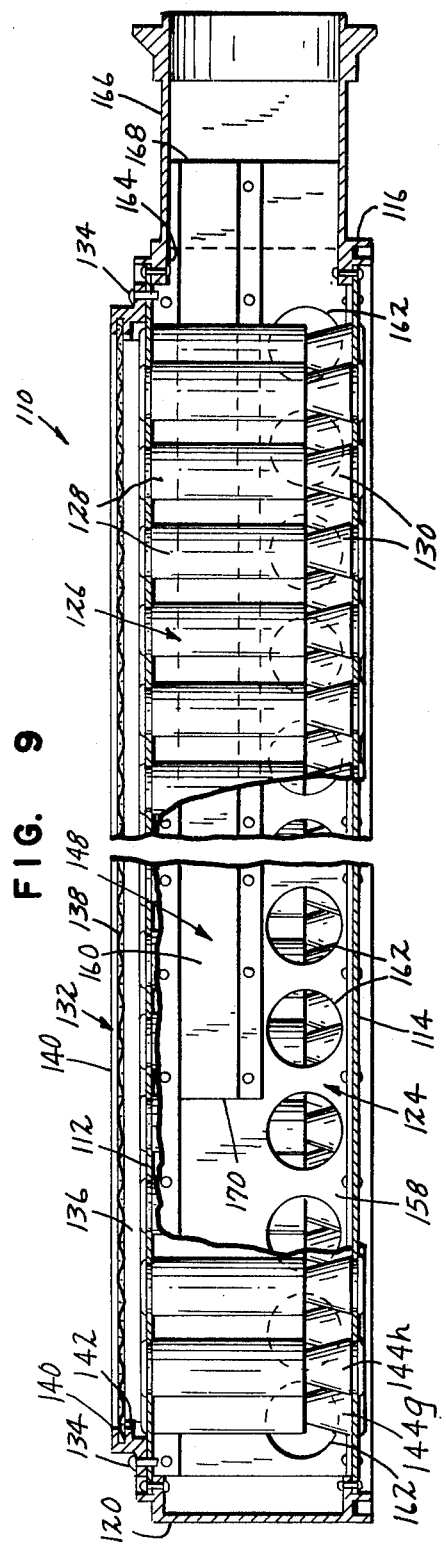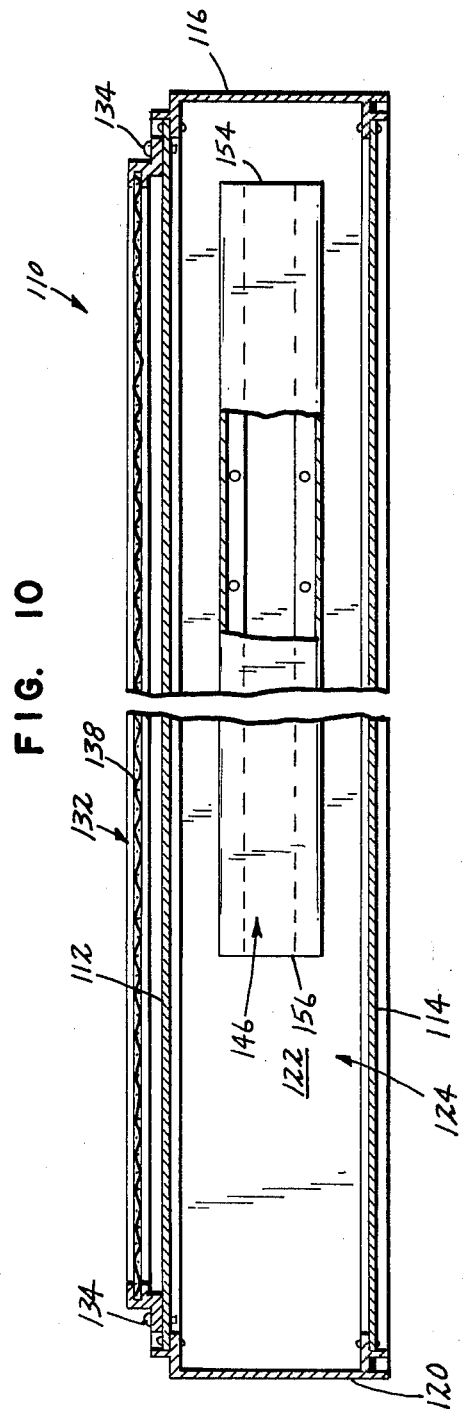

# AIR CLEANER ASSEMBLY

TECHNICAL FIELD

The present invention relates to air cleaner assemblies. More specifically, the present invention relates to air cleaner assemblies which utilize centrifugal separators to perform the function of separating particulate material from the fluid or air passing through the assembly. The air cleaner assemblies of the present invention find use as air cleaners for gas turbine engines.

BACKGROUND OF THE PRIOR ART

Centrifugal separators in and of themselves and the use of air cleaner assemblies which incorporate a plurality or bank of centrifugal separators are known in the prior art.

U.S. Pat. No. 3,713,280 issued to Keller et al discloses the construction of a typical prior art centrifugal separator. Centrifugal separators are generally tubular in construction. The separators form a spiral stream or flow of particulate-laden air passing through a tube. The spiral flow is induced either by placing a deflector in the tube in the path of an incoming air flow, or by introducing the air flow tangentially to the tube wall. Since the particles of material intermixed with the incoming air are relatively heavy, they are thrown outwardly to the periphery of the spiral.

The air at the center of the spiral is left relatively free of particulate material. The clean air is normally drawn off from the center of the tube and the particulate material is collected at the periphery of the tube. In order to obtain a large capacity for particulate material removal a plurality of centrifugal separators are arranged in an assembly. A scavenging air chamber is formed around the particulate material outlet of the tubes, and the clean air passes to the exterior of the scavenging air chamber. Assemblies of this type have been employed with diesel and gas turbine engines to clean the air entering the engine. Such assemblies have been used on engines in earth moving equipment, marine equipment, stationary power plants, over-the-road vehicles and aircraft.

U.S. Pat. No. 3,483,676 issued to Sargisson discloses an air cleaner assembly wherein a plurality of centrifugal-type separators are disposed in a frusto-conical shaped configuration. The frusto-conical shaped assembly is attached to the inlet end of a helicopter's gas turbine engine.

U.S. Pat. No. 3,520,114 issued to Pall et al and U.S. Pat. No. 3,915,679 issued to Roach et al each disclosed air cleaner assemblies wherein a plurality of centrifugal or vortex type air cleaners are arranged in a generally flat configuration. That is, all of the centrifugal separators are arranged generally parallel to one another. The Pall et al and the Roach et al patents each discuss the problem of pressure distribution within a scavenging chamber when a single scavenging outlet port is utilized. The Pall et al patent attempts to overcome this problem by the use of a plate 50 to adjust the pressure drop from an inlet 54 of each tube to the scavenging chamber 52. The Roach et al patent attempts to overcome this problem by the use of flow restrictors within the tubes of the centrifugal separators.

SUMMARY OF THE INVENTION

The present invention is directed to an air cleaner assembly. The air cleaner assembly includes a plurality of wall members interconnected with one another and defining between them a scavenging air chamber. A plurality of centrifugal separators are supported in the scavenging air chamber. Each of the centrifugal separators includes a first tubular member, a means for swirling air passing through the first tubular member and a second tubular member. The first tubular member has an inlet end for receiving incoming air and an outlet end in fluid communication with the scavenging air chamber. The second tubular member has an inlet end disposed adjacent the outlet end of said first tubular member and an outlet end exterior of the scavenging chamber. The swirling means forces solid materials carried by the air against the inner wall surface of the first tubular member to thereby pass through the outlet end of the first tubular member into the scavenging air chamber. A scavenging air outlet port is formed through one of the walls and is adapted to be coupled to a negative pressure source. At least one discrete conduit is disposed within the scavenging air chamber. The conduit has a first end adjacent the scavenging air outlet port and a second end in the scavenging air chamber a distance further from the scavenging air outlet port than the first end.

In one embodiment of the invention, the assembly takes on a generally cylindrical configuration with a first cylindrical wall of a first diameter and a second cylindrical wall of a second diameter less than the first diameter. The scavenging air chamber is formed between the first and second cylindrical walls and the plurality of separators extend generally radially between the first and second cylindrical walls. A pair of curved conduits is disposed within the scavenging air chamber. Each conduit has a first end adjacent the scavenging air outlet port and a second end disposed an angular distance therefrom. The second ends are arranged such that a space is formed between them. A portion of the space is approximately 180° opposite the scavenging air outlet port.

In another embodiment, the assembly takes on a generally flat configuration wherein a pair of opposed planar walls are surrounded by side walls to define therein the scavenging air chamber. A plurality of generally linear conduits are disposed within the scavenging air chamber.

By utilizing the conduits of the present invention, the effect of negative pressure which is applied to the scavenging air chamber through the scavenging air outlet port is staged. That is, the negative pressure is distributed to various points within the scavenging air chamber. This staging or distribution of the pressure results in increased operating efficiencies.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described preferred embodiments of the invention.

BRIEF DESCRIPTION OF THE DRAWINGS

FIG. 1 is a side elevational view of an air cleaner in accordance with the present invention;

FIG. 2 is a front elevational view of the air cleaner;

FIG. 3 is an enlarged sectional view taken generally along line 3—3 of FIG. 1;

FIG. 7 is a top plan view, partially broken away, of another embodiment of air cleaner in accordance with the present invention;

FIG. 8 is an enlarged sectional view taken generally along 8—8 of FIG. 7;

FIG. 9 is an enlarged sectional view taken generally along 9—9 of FIG. 7; and

FIG. 10 is an enlarged sectional view taken generally along 10—10 of FIG. 7.

DETAILED DESCRIPTION OF THE INVENTION

Figure 4:
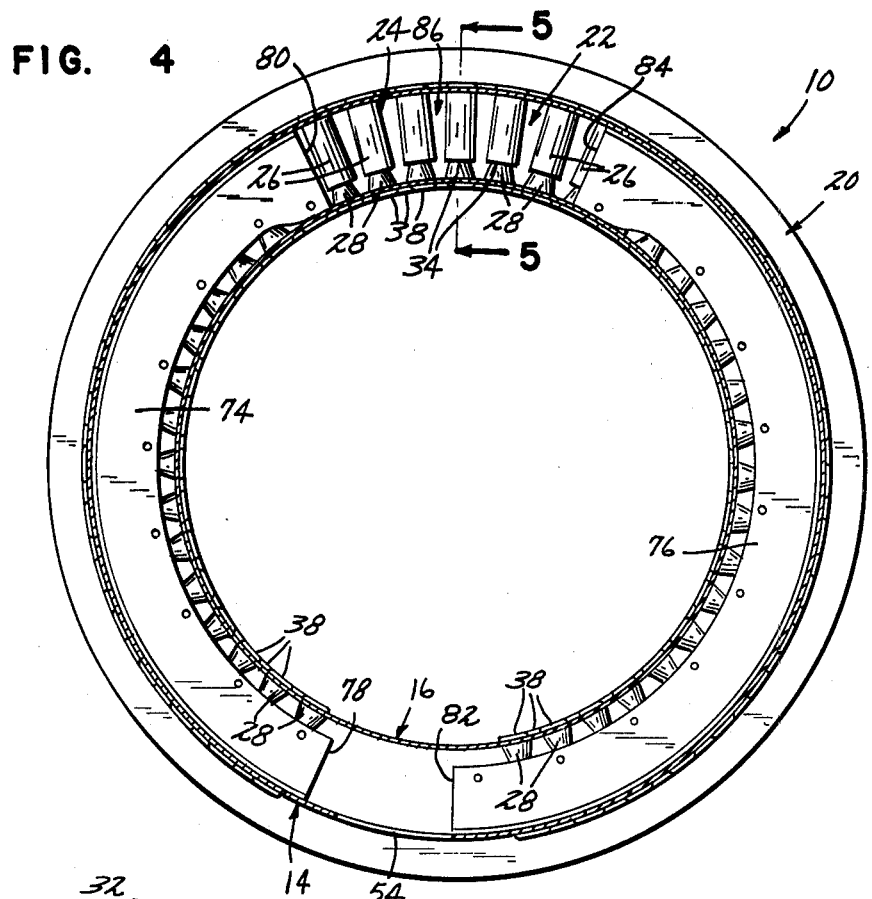
FIG. 4 is an enlarged sectional view taken generally along line 4—4 of FIG. 1.

Referring to the drawings in detail, wherein like numerals indicate like elements, there is shown an air cleaner assembly designated generally as 10. Shown in phantom line in FIG. 1 is an air inlet 12 to a gas turbine engine. The gas turbine engine may be a gas turbine engine of a helicopter. However, since the gas turbine engine and the helicopter do not per se form a portion of the invention, details of the engine and helicopter are not shown.

The air cleaner assembly 10 includes a first cylindrical wall member 14, a second inner cylindrical wall member 16, and a pair of opposed cover wall members 18, 20. Each cover wall member 18, 20 is attached to both the first and second cylindrical wall members 14, 16 to form therebetween a generally cylindrical shaped scavenging air chamber 22. A plurality of centrifugal separators 24 are supported in the scavenging air chamber 22. The centrifugal separators are arranged in a plurality of rows 23a-g.

Figure 5:
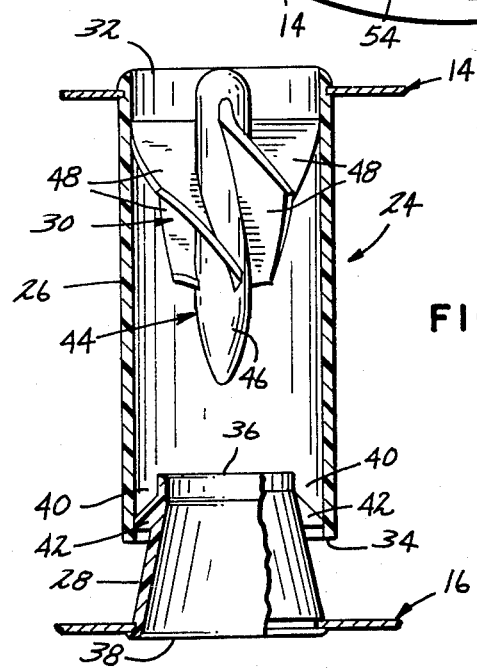
FIG. 5 is an enlarged sectional view taken generally along line 5—5 of FIG. 4.

Any conventional centrifugal-type separators can be used as the separators 24 in the present invention. A typical centrifugal separator 24 is illustrated in some detail in FIG. 5. The centrifugal separator 24 is comprised of a first tubular member 26, a second tubular member 28 and a means for swirling air passing through the first tubular member, designated generally as 30. The first tubular member 26 is attached within an opening in the cylindrical wall 14. The tubular member 26 may be constructed of a plastic material which can be snapped fit in the opening. The first tubular member 26 has an air inlet end 32 adjacent the cylindrical wall 14. With the separators 24 arranged radially about the scavenging chamber 22, the outer circumferential wall 14 thus serves as an air inlet side or surface of the assembly 10. The first tubular member 26 also has an outlet end 34 opposite the inlet end 32. The outlet end 34 is in fluid communication with the scavenging air chamber 22.

The second tubular member 28 has an inlet end 36 and an outlet end 38. The outlet 38 is secured to the cylindrical wall member 16 and the inlet end 36 is received within the outlet end 34 of the first tubular member 26. The inlet end 36 of the second tubular member 28 has an outer diameter smaller than the inner diameter of the outlet end 34 of the first tubular member 26. An annular gap 40 is thus formed between the first and second tubular members 26, 28 in the area of their ends 36, 34. The gap 40 serves a scavenging air outlet for passing scavenging air and particulate material intermixed therewith from the first tubular member 26 to the scavenging air chamber 22. A plurality of spacer members 42 extend from the second tubular member 28 at its end 36. The spacer members 42 contact the inner surface of the first tubular member 26 to hold the second tubular member 28 coaxially aligned therewith. The second tubular member may also be constructed of a plastic material and snap fit within the cylindrical wall 16.

The swirling means 30 is comprised of a deflecting element 44 mounted within the tubular member 26 adjacent its air inlet end 32. The deflecting element 44 is provided with a coaxially located hub member 46 and a plurality of curved vanes 48 that extend between the hub portion 46 and the inner wall surface of the tubular member 26. As the air passes downwardly through the tubular member 26, the deflecting element 44 produces a swirling motion causing the air or fluid stream to rotate in a spiral fashion as it continues in its passage through the tubular member 14. As the fluid passing through the centrifugal separator 24 swirls, the larger dirt particles or other heavy materials are thrown outwardly against the inner wall surface of the tubular member 26. The dirt particles thereafter pass through the gap 40 into the scavenging air chamber 22. The clean fluid or air at the center of the tubular member 26 passes downwardly and out through the center of the second tubular member 28. In the overall assembly 10, the clean air thus passes radially into the area within the cylindrical wall member 16 and is thereafter drawn through the air inlet 12 to an engine or apparatus with which the assembly 10 is utilized.

When the air cleaner assembly 10 is utilized with the gas turbine engine of an aircraft such as a helicopter, the cover wall member 18 as shown in FIGS. 1, 2, 3 and 6 is utilized. The cover wall member 18 includes a circular plate 50 which is attached to and extends between the first and second cylindrical walls 14, 16. As is best seen in FIG. 3, a plurality of slots 52a-52e are formed through the plate 50 at spaced angular intervals. A scavenging air outlet port 54 is formed through the cylindrical wall 14 adjacent the slot 52c. The outlet port 54 is connected to a source of negative pressure to draw scavenging air and particles intermixed therewith out of the scavenging air chamber 22. An inner jacket 56 and an outer jacket 58 are connected to the plate 50. The inner jacket 56 is generally circular in configuration and extends inwardly from the inner cylindrical wall 16. A pair of doors 60, 62 are pivotably mounted to the jacket 56 by means of bearing blocks 64. Opposite ends of a pneumatic piston rod mechanism 65 are connected to coupling brackets 66 which are carried by bearing blocks 64 as shown in FIG. 2. The coupling brackets 66 are each fixed to an axle rod of a respective door 60, 62. The piston rod mechanism 65 can be expanded or retracted thus pivoting the door 60, 62 between an open and closed position. The mechanism 65 or the doors 60, 62 can be biased to one of the open or closed positions and the application of fluid pressure to the mechanism 65 can move the doors to the opposite position. The doors 60, 62 are used to control the direction in which air flows to the air inlet 12 of the engine. In their closed position, the doors 60, 62 force the inlet air flow through the separator 24, while in the open position, the separators 24 are by-passed.

The outer jacket 58 is attached at one radial end to the plate 50 and at another radial end to the inner jacket 56. The outer jacket 58 extends through a curved arc around the perimeter of the plate 50 in the area of the slots 52a-e. The outer jacket has end walls 68 to thus form a sealed chamber or conduit 70 between the plate 50 and the outside environment. The function of the conduit 70 will be explained more fully hereinafter.

A pair of discrete conduits 74, 76 are disposed between adjacent rows of separators 24 and are attached to the inner surface of the wall 14. See FIGS. 4 and 6. The conduit 74 has a first end 78 disposed adjacent to the scavenging air outlet port 54 and a second end 80 spaced therefrom. The conduit 74 takes on a generally curved configuration conforming to that of the scavenging air chamber 22. The conduit 76 has a first end 82 adjacent the scavenging air outlet port 54 and a second end 84 spaced therefrom. The conduit 76 also takes on a curved configuration conforming to the scavenging air chamber 22. The conduit 74 has an angular extent of approximately 130° and the conduit 76 has an angular extent of approximately 155°. A gap 86 is formed between the second ends 80, 84 of the conduit 74, 76. The gap 86, or at least a portion thereof, is disposed approximately 180° around from the scavenging air outlet port 54. The conduits 74, 76 thus serve to stage or distribute the negative pressure applied through the scavenging air outlet port 54. By so staging the applied pressure, the efficiency of the assembly 10 is increased.

The conduit 70 serves as a secondary conduit to further stage or distribute the pressure applied through the scavenging air outlet port 54. As is shown by arrows 88 in FIG. 3, the scavenging air is drawn into the conduit 70 through slots 52a, b, d and e and as shown by arrows 90, thereafter passes out of the conduit 70 through slot 52c to the scavenging air outlet port 54.

Figure 6:
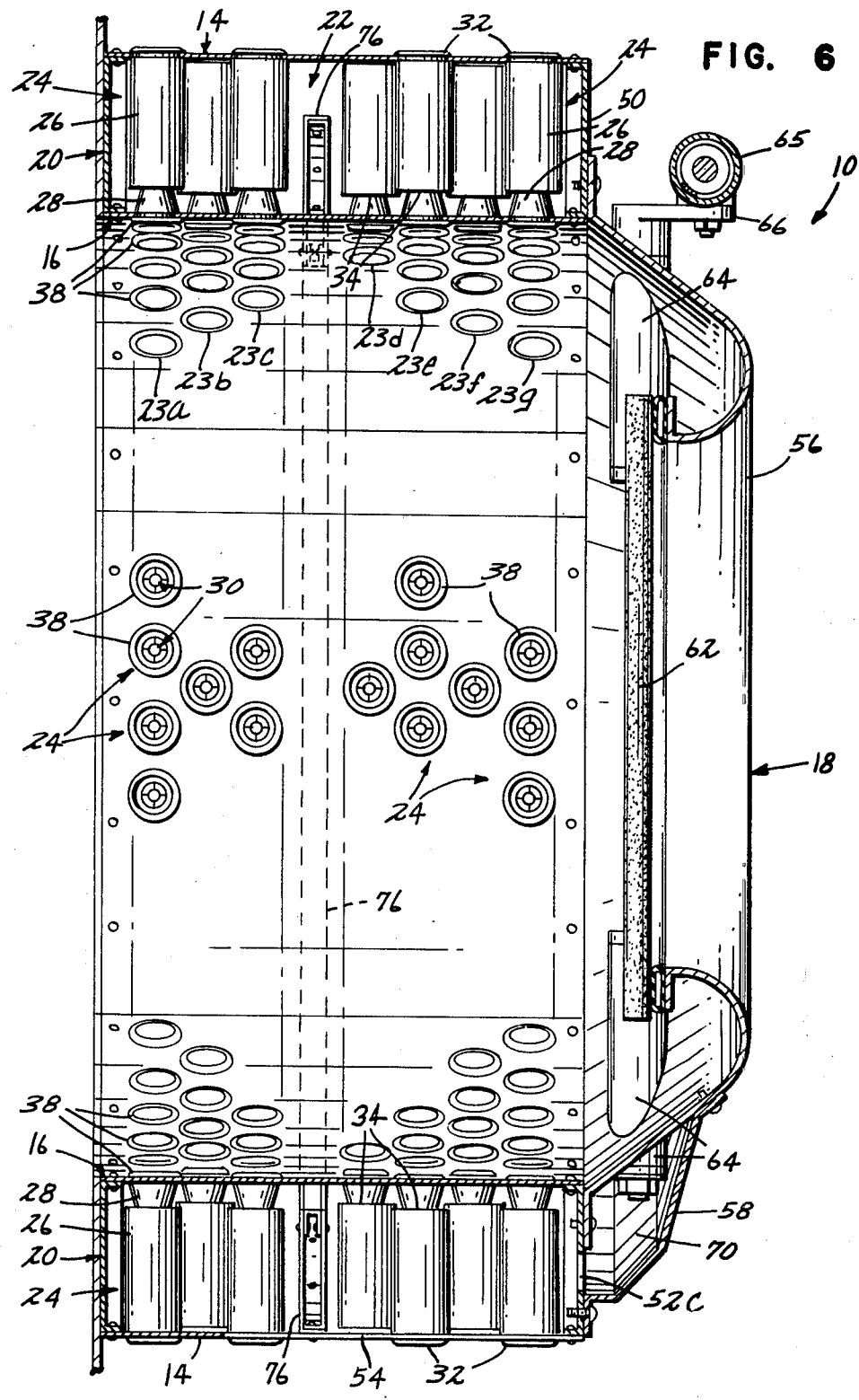
FIG. 6 is an enlarged sectional view taken generally along line 6—6 of FIG. 2.

As seen in FIG. 6 the conduit 76 has a generally flat rectangular configuration with the longitudinal dimension of the rectangle extending from the wall 14. The longitudinal dimension of the conduit 76 extends over a major portion of the dimension between the cylindrical walls 14, 16. The conduit 74 is similarly configured.

Referring to FIGS. 7–10, there is shown another embodiment of an air cleaner assembly in accordance with the present invention, designated generally as 110. The air cleaner assembly 110 includes a first or top wall member 112, a second or bottom wall member 114 and a plurality of side wall members 116, 118, 120 and 122 attached to and extending between the top and bottom wall members 112, 114. A scavenging air chamber 124 is thereby formed between the wall members 112, 114, 116, 118, 120 and 122. A plurality of conventional centrifugal separators 126, which can be of similar construction as the separators 24, are supported in the scavenging air chamber 124. Each centrifugal separator 126 is comprised of a first tubular member 128 attached to the top wall 112, a second tubular member 130 attached to the bottom wall 114 and a means for swirling air passing through the first tubular member 128.

A support bracket 132 is removably attached by screws 134 to the top surface of the top wall member 112. The support bracket 132 extends around the interior perimeter of the top wall member 112. A pair of longitudinally extending support braces 136 are also attached to the top wall member 112. A grate 138 is secured between a pair of horizontally extending ledges 140, 142 of the bracket 132 and is supported on top of the braces 136. Since the assembly 110 can be rather large, the grate 138 is utilized as a walking surface. This is particularly true when the assembly 110 is utilized with a military vehicle, such as a tank.

The centrifugal separators 126 are arranged in a plurality of generally parallel rows 144a–o. A plurality of generally linear discrete conduits 146, 148, 150 and 152 are supported in the scavenging air chamber 124. The conduits 146, 152 are attached respectively to the walls 122, 118. As seen in FIG. 10, the conduit 146 extends longitudinally along the wall 122 and has a first end 154 adjacent the side wall 116 and a second end 156. The conduit 152 similarly extends along the side wall 118. The conduits 146, 152 take on a generally rectangular configuration with the inner surface of side wall 122 and 118 forming a wall of the conduits 146, 152 respectively. The conduit 148 extends longitudinally between adjacent rows 144e, 144f and the conduit 150 extends longitudinally between adjacent rows 144j, 144k. Each conduit 148, 150 is similarly constructed and is comprised of a first brace plate 158 and a second plate 160 interconnected. The brace plate 158 extends between and has horizontal surfaces attached to the top and bottom wall members 112, 114. The plate 160 is generally right angled and has an upstanding wall secured to the support plate 158 and a lower flange extending from a lower horizontal section which is also attached to the brace plate 158. As best seen in FIG. 9, the brace plate 158 extends along substantially the entire length of scavenging air chamber 124 to provide support between the top and bottom wall members 112, 114. The brace plate 158 has a plurality of openings 162 formed through it so that open fluid communication is provided throughout the entire scavenging air chamber 124.

A scavenging air outlet port 164 is formed through the wall 116. A tappered coupling member 166 is in fluid communication with the scavenging air outlet port 164 and places the scavenging air outlet port 164 in communication with a negative pressure source. Thus, in a manner similar to the assembly 10, the air cleaner assembly 110 draws scavenging air and particulate material through the scavenging air chamber 124 and thereafter out through the outlet port 164.

The first end 154 of the conduit 146 is disposed adjacent the side wall 116. A first end of the conduit 152 is similarly disposed adjacent the wall 116. The conduits 146, 152 thus have ends adjacent the scavenging air outlet port 164. As seen in FIG. 7, the conduits 148, 150 each have first ends 168 within the coupling member 166. The conduits 148, 150 thus also have first ends adjacent the scavenging air outlet port 164. The conduits 148, 150 also have second ends 170 disposed a longitudinal distance from the scavenging air outlet port 164 as illustrated in the drawings, the second ends of the conduits 146, 148, 150 and 152 are disposed longitudinally inward of the scavenging outlet port 164 a distance approximately 75% of the length of the scavenging air chamber 124. It has been found that this particular placement of the second ends stages the negative pressure applied at the scavenging air outlet port 164 in a manner similar to the operation of the assembly 10. The second ends of the conduits 146, 148, 150 and 152 could be staggered at different distances longitudinally within the scavenging air chamber 124. As with the conduits 74 and 76 of the air cleaner assembly 10, the conduits 146, 148, 150 and 152 increase the efficiency of operation of the assembly 110 by staging or distributing the negative pressure applied to the scavenging air chamber 124.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

We claim:

1. An air cleaner assembly comprising:
a plurality of interconnected wall members;
a scavenging air chamber defined between said wall members;
a plurality of centrifugal separators supported in said scavenging air chamber;
each of said centrifugal separators including a first tubular member having an inlet end for admitting air and an outlet end in fluid communication with said scavenging air chamber, means for swirling air passing through said first tubular member to force solid materials carried by said air against the inner wall surface of said tubular member, and a second tubular member having an inlet end disposed adjacent said outlet end of said first tubular member and an outlet end exterior of said scavenging air chamber;
a scavenging air outlet port formed through one of said wall members and adapted to be coupled to a negative pressure source for drawing scavenged air and solid materials intermixed therewith from said scavenging air chamber; and
at least one discrete conduit disposed within said scavenging air chamber, said at least one conduit having an interior defined by enclosing wall means, the interior of said at least one conduit being sealed from said scavenging air chamber except for an inlet opening to said at least one conduit and an exhaust opening from said at least one conduit, said exhaust opening being adjacent said scavenging air outlet port and said inlet opening being located in said scavenging air chamber at a distance further from said scavenging air outlet port than said exhaust opening whereby negative pressure applied through said scavenging air outlet port is staged to enhance the separating efficiency of the assembly.

2. An air cleaner assembly in accordance with claim 1 wherein said centrifugal separators are aligned in a plurality of rows.

3. An air cleaner assembly in accordance with claim 2 wherein said at least one conduit is disposed between a pair of adjacent rows of said centrifugal separators and said wall means has a generally rectangular cross-section with its longitudinal dimension extending generally along the longitudinal dimension of said centrifugal separators.

4. An air cleaner assembly in accordance with claim 1 wherein the wall means of said plurality of wall members defining said scavenging air chamber includes a first cylindrical wall member having a first diameter, a second cylindrical wall member having a second diameter less than said first diameter, said second cylindrical wall member being received within said first cylindrical wall member, and a pair of opposing cover wall members each attached to said first and second cylindrical wall members to form a generally ring-shaped scavenging air chamber between said wall members.

5. An air cleaner assembly in accordance with claim 4 wherein the longitudinal dimension of said separators extends generally radially between said first and second cylindrical wall members, said separators being aligned in a plurality of rows, and the inlet ends of said first tubular members being disposed at said first cylindrical wall member and said outlet ends of said second tubular members being disposed at said second wall member.

6. An air cleaner assembly in accordance with claim 5 wherein said scavenging air outlet port is formed through said first cylindrical wall member.

7. An air cleaner assembly in accordance with claim 5 wherein the wall means of said at least one conduit is disposed between adjacent rows of said separators and extends from said scavenging air outlet port in a curved configuration through said scavenging air chamber.

8. An air cleaner assembly in accordance with claim 7 wherein the wall means of said at least one conduit has a generally flat rectangular cross-section with a longitudinal dimension extending over a major portion of the radial distance between said first and second cylindrical walls.

9. An air cleaner assembly in accordance with claim 7 or 8 said at least one conduit includes a pair of conduits and wherein the inlet opening of each conduit is located at a second end of each conduits, said second ends being located to form a space between each other, and at least a portion of said space being disposed approximately 180° from the scavenging air outlet port.

10. An air cleaner assembly in accordance with claim 4 or 7 wherein one of said cover wall members has a plurality of slots formed through it at a plurality of locations, one of said slots being formed adjacent said scavenging air outlet port, and a jacket member attached to said last mentioned cover wall member to form a secondary conduit about said slots.

11. An air cleaner assembly in accordance with claim 1 wherein said plurality of wall members includes a pair of first and second oppositely disposed wall members, said first and second wall members having a generally planar configuration, and side wall members attached to and extending between said first and second wall members.

12. An air cleaner assembly in accordance with claim 11 wherein said centrifugal separators are aligned in a plurality of rows and said at least one discrete conduit extends between a pair of adjacent rows.

13. An air cleaner assembly in accordance with claim 12, said at least one discrete conduit includes a plurality of conduits.

14. An air cleaner assembly in accordance with claim 11 wherein said first and second wall members have a generally rectangular configuration to define a generally rectangular shaped scavenging air chamber, and wherein said outlet port is disposed to one side of the lengthwise dimension of said scavenging air chamber.

15. An air cleaner assembly in accordance with claim 14 wherein said scavenging outlet port is formed through a side wall extending along a widthwise dimension of said scavenging air chamber.

16. An air cleaner assembly in accordance with claim 15 wherein said at least one discrete conduit includes a plurality of conduits extend in a generally linear direction along the lengthwise dimension of said scavenging air chamber.

17. An air cleaner assembly in accordance with claim 16 wherein each conduit has a generally rectangular cross-section.

18. An air cleaner assembly in accordance with claims 16 or 17 wherein at least one of said conduits extends through at least 60% of the lengthwise dimension of said scavenging air chamber.

19. An air cleaner assembly in accordance with claim 16 wherein one of said conduits is attached to each side wall extending along the lengthwise dimension of said scavenging air chamber, and at least one of said conduits is disposed between an adjacent pair of rows of centrifugal separators, said conduits disposed between adjacent rows of centrifugal separators each including a support plate extending between and attached to said first and second wall members.

20. An air cleaner assembly comprising:
   a housing including a first cylindrical wall member having a first diameter, a second cylindrical wall member having a second diameter less than said first diameter, said second cylindrical wall member being supported within said first cylindrical wall member, and a pair of opposing cover wall members attached to said first and second cylindrical wall members;
   a generally ring-shaped scavenging air chamber defined between said wall members;
   a plurality of centrifugal separators supported in said cylindrical chamber, each of said separators having a longitudinal dimension extending generally radially between said first and second cylindrical wall members, said separators being aligned in a plurality of rows;
   each of said centrifugal separators including a first tubular member having an inlet end for admitting air and an outlet end in fluid communication with said scavenging air chamber, means to swirl air passing through said first tubular member to force solid materials carried by said air against the inner wall surface of said tubular member, and a second tubular member having an inlet end disposed adjacent said outlet end of said first tubular member and an outlet end exterior of said scavenging air chamber, said inlet end of said first tubular member being disposed at said first cylindrical wall member and said outlet end of said second tubular member being disposed at said second wall member;
   a scavenging air outlet port formed through said first cylindrical wall member and being adapted to be coupled to a negative pressure source for drawing scavenging air and solid materials intermixed therewith from said scavenging air chamber;
   a pair of discrete conduits disposed between a single pair of adjacent rows of centrifugal separators, each conduit having an interior defined by enclosing wall means, the interior of each conduit being sealed from said scavenging air chamber except for an inlet opening to each conduit and an exhaust opening from each conduit, each exhaust opening being located adjacent said scavenging air outlet port and each inlet opening being located in said scavenging air chamber at a distance further from said scavenging air outlet port than said exhaust openings whereby negative air pressure applied through said scavenging air outlet port is staged to enhance the separating efficiency of the assembly, each of said conduits having a generally curved shape conforming to the shape of said scavenging air chamber, a space being formed between the second ends of said conduits, and at least a portion of said space being disposed approximately 180° from said scavenging air outlet port.

21. An air cleaner assembly in accordance with claim 20 wherein one of said cover wall members has a plurality of slots formed through it at a plurality of locations, one of said slots being formed adjacent said scavenging air outlet port, and a jacket member attached to said last-mentioned cover member to form a secondary conduit about said slots exterior of said scavenging air chamber.

22. An air cleaner assembly in accordance with claim 21 including a second inner jacket member attached to said cover member which supports said first jacket member, said inner jacket member having a generally circular configuration defining an inlet area to the space radially inward of said second cylindrical wall member, said inner jacket having a pair of pivotable doors supported on mounting means connected to said inner jacket, said doors being pivotable on said mounting means between an open and a closed position for blocking said inlet area in their closed position.

23. An air cleaner assembly in accordance with claim 20 wherein said centrifugal separators are aligned in seven rows and said discrete conduits are disposed between fourth and fifth rows of said centrifugal separators.

24. An air cleaner assembly in accordance with claim 20 or 23 wherein each discrete conduit has an angular extent of at least 100°.

25. An air cleaner assembly comprising:
   a housing including a top wall member, a bottom wall member, and a plurality of side wall members attached to and extending between the top and bottom wall members, said top and bottom wall members being generally planar and rectangular in shape;
   a generally rectangular shaped scavenging air chamber defined between said wall members;
   a plurality of centrifugal separators supported within said scavenging air chamber in a plurality of aligned rows;
   each of said centrifugal separators including a first tubular member having an inlet end for admitting air and an outlet end in fluid communication with said scavenging air chamber, means to swirl air passing through said first tubular member to force solid materials carried by said air against the inner wall surface of said tubular member, and a second tubular member having an inlet end disposed adjacent said outlet end of said first tubular member and an outlet end exterior of said scavenging air chamber;
   a scavenging air outlet port formed through one of the width-wise side walls and adapted to be coupled to a negative pressure source for drawing scavenging air and solid materials intermixed therewith from said scavenging air chamber;
   a plurality of discrete conduits extending in a generally linear direction along the lengthwise dimension of said scavenging air chamber, each conduit having an interior defined by enclosing wall means, the interior of each conduit being sealed from said scavenging air chamber except for an inlet opening to each conduit and an exhaust opening from each conduit, one of said discrete conduits being attached to each side wall extending in the lengthwise dimension of said scavenging air chamber, and at least one of said conduits being disposed between an adjacent pair of rows of centrifugal separators, said conduits disposed between adjacent rows of centrifugal separators each including a support brace extending between and attached to said top and bottom wall members, each exhaust opening being located adjacent to the said scavenging air outlet port and each inlet opening being disposed a distance further into said scavenging air chamber whereby negative pressure applied through said scavenging air outlet port is staged to enhance the separating efficiency of the assembly.

26. An air cleaner assembly in accordance with claim 25 including a grate supported above the top wall member.

* * * * *